US006832386B1

(12) United States Patent
Jerding et al.

(10) Patent No.: US 6,832,386 B1
(45) Date of Patent: Dec. 14, 2004

(54) SYSTEM AND METHOD FOR ALLOWING A USER TO QUICKLY NAVIGATE WITHIN A PROGRAM GUIDE TO AN ESTABLISHED REFERENCE POINT

(75) Inventors: Dean F. Jerding, Roswell, GA (US); Robert O. Banker, Cumming, GA (US); Gregory S. Durden, Jonesboro, GA (US); Arturo Rodriguez, Norcross, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 0 days.

(21) Appl. No.: 09/494,209

(22) Filed: Jan. 28, 2000

Related U.S. Application Data
(60) Provisional application No. 60/138,757, filed on Jun. 11, 1999, and provisional application No. 60/170,302, filed on Dec. 13, 1999.

(51) Int. Cl.$^7$ .................................................. G06F 3/00
(52) U.S. Cl. .............................. 725/39; 725/61; 725/40; 725/41
(58) Field of Search ..................................... 725/37–61

(56) References Cited

U.S. PATENT DOCUMENTS

| | | | | |
|---|---|---|---|---|
| 4,706,121 A | | 11/1987 | Young .......................... | 358/142 |
| 4,751,578 A | | 6/1988 | Reiter et al. .................. | 358/183 |
| 4,908,713 A | | 3/1990 | Levine .......................... | 358/335 |
| 4,963,994 A | | 10/1990 | Levine .......................... | 358/335 |
| 5,038,211 A | | 8/1991 | Hallenbeck .................. | 358/142 |
| 5,253,066 A | | 10/1993 | Vogel ........................... | 358/188 |
| 5,293,357 A | | 3/1994 | Hallenbeck .................. | 348/734 |
| 5,479,268 A | | 12/1995 | Young et al. ................. | 358/335 |
| 5,508,815 A | | 4/1996 | Levine .......................... | 358/335 |
| 5,568,272 A | | 10/1996 | Levine .......................... | 386/48 |
| 5,589,892 A | * | 12/1996 | Knee et al. ................... | 348/731 |
| 5,699,107 A | * | 12/1997 | Lawler et al. ................ | 725/41 |
| 5,809,204 A | | 9/1998 | Young et al. ................. | 386/83 |
| 5,850,218 A | * | 12/1998 | LaJoie et al. ................ | 725/45 |
| 5,915,068 A | | 6/1999 | Levine ......................... | 386/83 |
| 5,990,927 A | * | 11/1999 | Hendricks et al. .......... | 725/132 |
| 6,005,631 A | | 12/1999 | Houser et al. | |
| 6,014,184 A | * | 1/2000 | Knee et al. ................... | 725/45 |
| 6,239,794 B1 | * | 5/2001 | Yuen et al. .................... | 725/41 |
| 6,243,142 B1 | | 6/2001 | Mugura et al. ............. | 348/564 |
| 6,266,814 B1 | * | 7/2001 | Lemmons et al. ........... | 755/44 |
| 6,481,010 B2 | * | 11/2002 | Nishikawa et al. .......... | 725/44 |
| 6,518,986 B1 | * | 2/2003 | Mugura ....................... | 345/810 |
| 6,536,041 B1 | * | 3/2003 | Knudson et al. ............ | 725/39 |
| 6,542,169 B1 | * | 4/2003 | Marshall et al. ............ | 345/781 |
| 6,564,378 B1 | * | 5/2003 | Satterfield et al. ........... | 725/40 |
| 2002/0044762 A1 | | 4/2002 | Wood et al. .................. | 386/68 |

FOREIGN PATENT DOCUMENTS

| | | |
|---|---|---|
| EP | 0 909 095 | 4/1999 |
| WO | WO 97/34414 | 9/1997 |

OTHER PUBLICATIONS

"Netscape Navigator Help," Netscape Navigator Software User Documentation, Netscape Communications Corporation, http://home.netscape.com, Aug. 10, 1997.
"Netcaster Developer's Guide," Devedge Online Documentation, Netscape Communications Corporation, http://developer.netscape.com/docs/manuals/netcast/devguide/index.html, Sep. 25, 1997.

* cited by examiner

*Primary Examiner*—John Miller
*Assistant Examiner*—Annan Q. Shang

(57) ABSTRACT

A method and system that allows a user to, with a single button press on a remote control, quickly navigate within a program guide to an established reference point, such as the program information associated with the last viewed channel and the current time. The establishment of a reference point provides a subscriber with a known position within program information that may cover weeks of time, thousands of channels, and a variety of categories or sorting methods. The subscriber that has advanced through many hours and channels of program information is provided with a method of easily navigating to a known reference within the program information.

41 Claims, 3 Drawing Sheets

SYSTEM AND METHOD FOR ALLOWING A USER TO QUICKLY NAVIGATE WITHIN A PROGRAM GUIDE TO AN ESTABLISHED REFERENCE POINT

CROSS-REFERENCE TO RELATED APPLICATIONS

The present application claims priority to U.S. Provisional Patent Application No. 60/138,757, Jerding et al., entitled Enhanced Interactive Program Guide User Interface for a Home Communications Terminal, filed 11 Jun. 1999, and to U.S. Provisional Patent Application No. 60/170,302, Jerding et al., entitled Home communications terminal Resident Application, filed 13 Dec. 1999.

FIELD OF THE INVENTION

The present invention relates to a television program guide in a subscriber television system and, more specifically, to allowing a user to quickly navigate within the program guide to an established reference point such as the program information associated with the last channel viewed and the current time.

BACKGROUND OF THE INVENTION

In a subscriber television system, television services have traditionally included little more than an analog broadcast video source. Recently, however, digital programming has become a reality with the home communications terminal ("HCT"), otherwise known as the set-top box, becoming a powerful computing device for accessing video services, and navigating a user through the maze of available services. In addition to supporting traditional analog broadcast video and functionality, digital HCTs (or "DHCTs") now also support an increasing number of services that are not analog, but rather digital; are not broadcast, but rather two-way communication as for example video-on-demand; and are not video, but are data such as e-mail or web browsers. These are all in addition to the host of other television services that are available to subscribers using DHCTs, examples of which include audio and audio/visual programming, advanced navigation controls, impulse pay-per-view technology, and online commerce to name but a few. There is an increase by several orders of magnitude of the services that are increasingly available in the digital world.

As more services and applications are provided, subscriber television systems are providing television program information to the HCT so that the subscriber can view the program information on the television itself. This program information has traditionally been organized for presentation purposes into a program guide format that presents the guide information by time and channel only. The program guides have been little more than grids with channel number and time presented on the x and y axes and the program information about the related programs within the grid. The program guide can, for instance, automatically scroll through the available television channels to present the program information, such as name and description, starting at the current time and for a set time range into the future, usually an hour and a half to two hours.

With the advent of program guide "browsers", including interactive program guides (IPG), mini-guides, and browse banners for use in subscriber television systems, subscribers can linearly scan program information by time and channel while watching the tuned channel. In analog systems that offer a limited number of television channels, these browsers permit the subscriber to easily scan the available programs one-by-one in order of channel number. A subscriber can scan program information typically by using several buttons or keys on a remote control to scroll through the programs. Each press of the button or keystroke changes the selected guide channel or time by one unit. However, many digital subscriber television systems provide hundreds or even thousands of channels and several days or even weeks of programming information for each of the multitude of channels. In such systems, scanning program information sequentially can require hundreds of keystrokes by the subscriber and can consume tremendous amounts of time. Furthermore, locating a particular program can be quite difficult if the subscriber does not already know the channel number for the program for which they are searching.

In addition, traditional subscriber television systems have failed to provide the types of complex, graphically rich interactive program guide applications that are becoming popular with more sophisticated consumers of current digital systems. The operator of a subscriber television system needs to provide a program guide that is as user friendly as possible to encourage the subscribers to purchase, access, and use the additional programs and services they can locate through a program guide. To help make the guide as user friendly as possible, it would be beneficial for the subscriber to be able to easily navigate to an established reference point should they lose their way while navigating all the program information that is available in the program guide. Even with simple program guides a standard reference is useful and with more complicated and interactive program guides it becomes essential.

Thus in a user friendly subscriber television system program guide, there is a need for an efficient method and system that allows a user to quickly navigate within a program guide to an established reference point.

DETAILED DESCRIPTION

Figure 1:
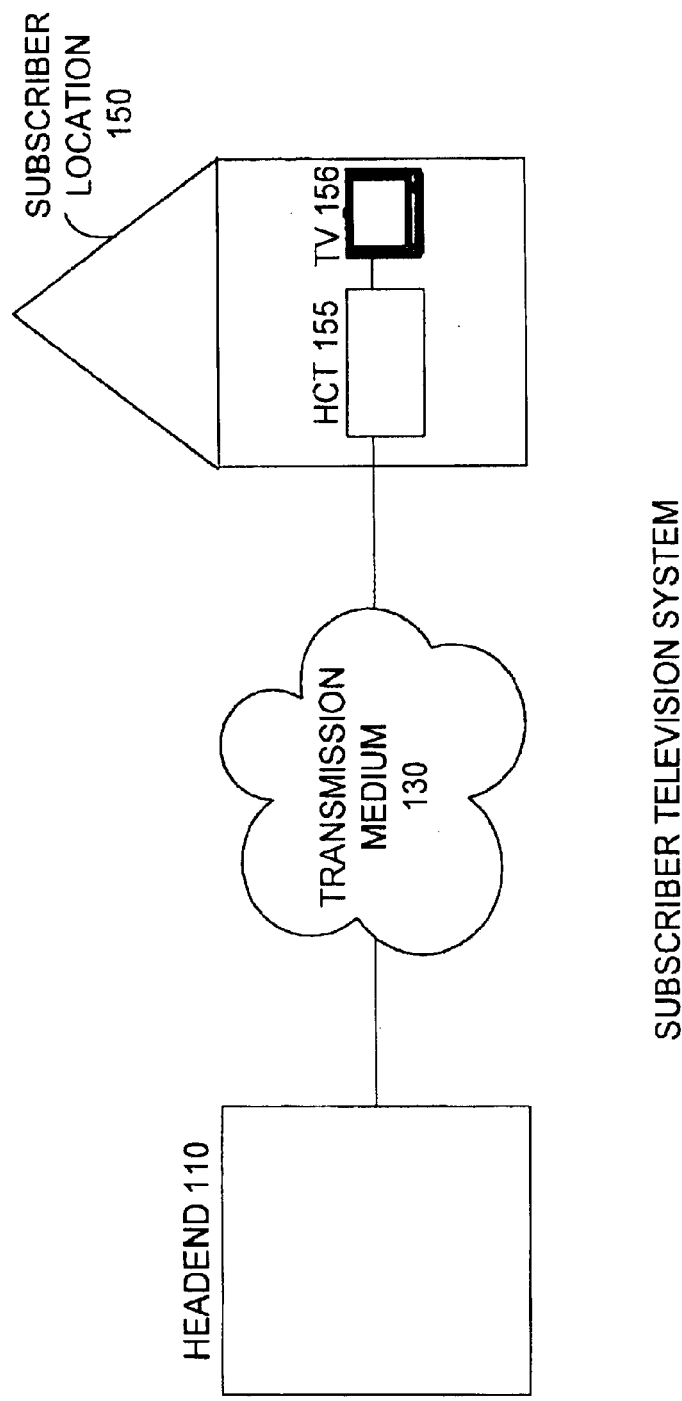
FIG. 1 is an overview of a Subscriber Television System.

The present invention is directed to an efficient method and system that allows a user to quickly navigate within a program guide to an established reference point, such as the program information associated with the last viewed channel and the current time. To help make the guide as user friendly as possible, the present invention provides a way for a subscriber, by pushing a single button on a remote control, to easily navigate to an established reference point should they lose their way while navigating all the program information that is available in program guides.

The present invention is best understood within the context of a subscriber television system. Referring now to the drawings, in which like numerals represent like elements throughout the several figures, a subscriber television system and exemplary embodiments of the present invention will be described.

FIG. 1 is an overview of a subscriber television system 100. In the subscriber television system 100, a headend 110 receives and combines television programming and information for distribution to the subscriber locations 150 via a transmission medium 130, such as a two-way digital hybrid fiber-coax (HFC) network. A Home Communications Terminal (HCT) 155 interfaces to the transmission medium 130 and provides the subscriber television services to be displayed on a display device, such as television 156. Program information is transmitted from the headend 110 to the HCT 155. The program information is stored in the HCT 155. The information can be stored as a database, such as an electronic program guide (EPG) database. The HCT 155 can cause the program information to be displayed on television 156 by retrieving program information from an EPG database. The display format, such as a program guide, is controlled by the HCT 155. A central processing unit (CPU) in HCT 155 reads the program information from the EPG database stored in memory of the HCT155. The CPU would process and format the program information for display. The HCT 155 sets the parameters for displaying the program information based on downloaded instructions from the headend 150 or instructions initially stored or downloaded to HCT 155 during its initial system staging and set-up.

An example of a program guide for use within a subscriber television system is provided in U.S. Pat. No. 6,005,631, entitled "Method for Searching Electronic Program Guides", which is incorporated herein by reference.

Figure 2:
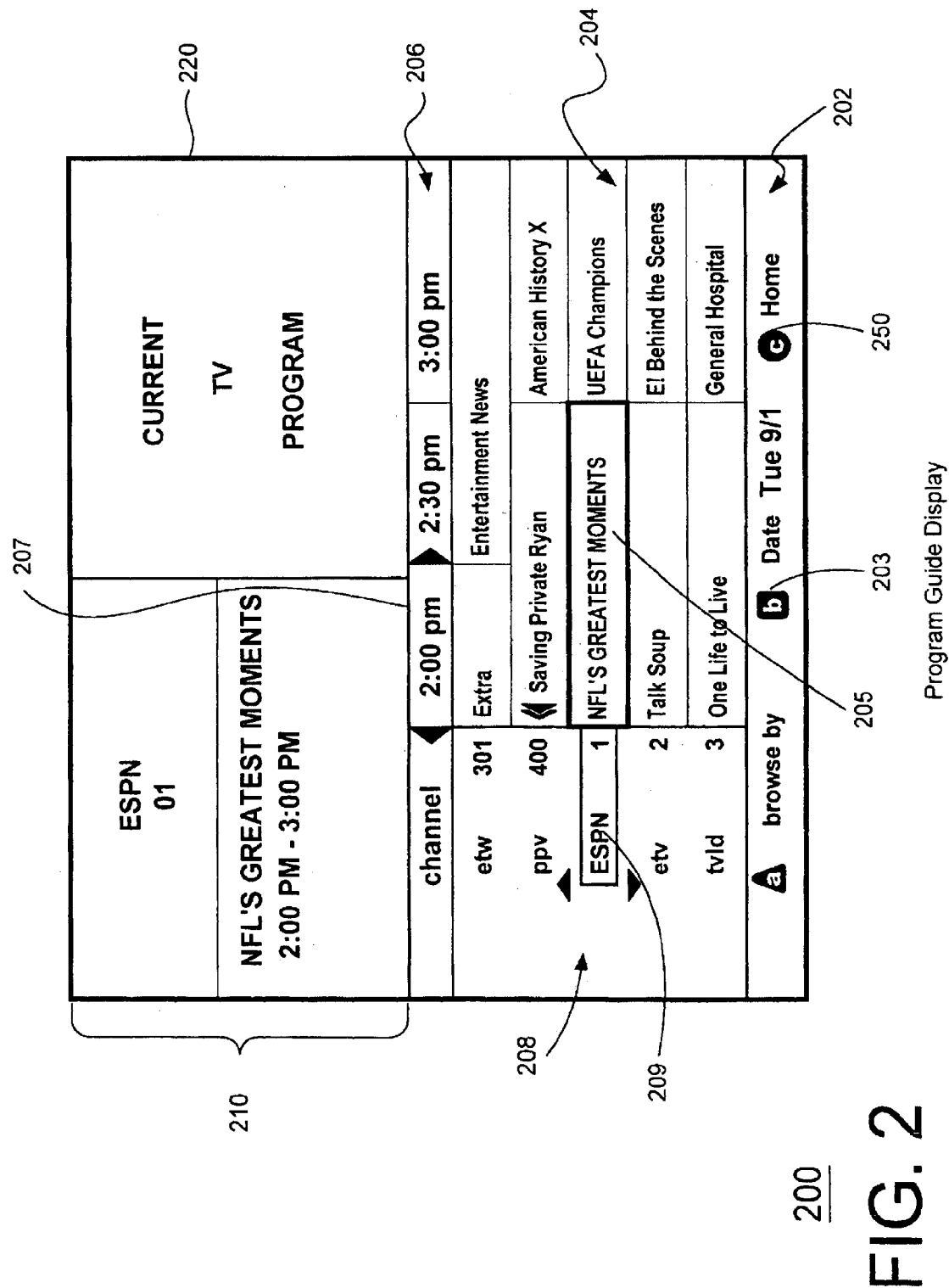
FIG. 2 is an illustration of a display associated with a program guide.

FIG. 2 is an illustration of a display associated with a program guide. The program guide display 200 includes several blocks of information organized to allow a user to easily scan the program information and select program information of interest. The blocks include a Instruction block 202, Program Title block 204, Time block 206, Channel Identification block 208, Program Description block 210, and Picture block 220. A viewer or subscriber navigates through the displayed program, selects desired program information, invokes navigation, or invokes navigation direction by activating an input from a front panel or an input device such as a remote control unit or a keyboard.

Information displayed on an EPG graphical user interface (GUI) is representative of the program information stored in the memory of HCT 155 as the EPG database. The information displayed in an EPG GUI is representative of the machine state of the EPG software application executing in the HCT 155 computational resources, such as the CPU and memory. Alternatively the EPG database, in whole or part, may reside in a data storage device such as an optical or magnetic hard drive internally part of HCT 155 or externally connected to HCT 155. In another embodiment, the EPG database resides in a data server located in a headend or node of the subscriber television system. The EPG database can be accessed via a network interface such as a channel tuner.

In FIG. 2 the Instruction block 202 displays navigational information associated with the program guide and, in this example, a date. Pressing the A button on a remote control unit allows the subscriber to select from a listing of alternative display options in a pop-up dialog window. The date is user selectable and allows the user to navigate to other dates by pressing the B button on a remote control, as indicated by the Date icon 203. Pressing the B button allows the subscriber to select from a pop-up date display window. Time block 206 displays a highlighted time 207, 5:00 PM, and a time range associated with highlighted time 207. The highlighted time 207 can be the time associated with entry into a program guide or a user selected time. Channel Identification block 208 displays a highlighted channel 209 and a service provider, ESPN, associated with the highlighted channel 209. The highlighted channel 209 can be the channel associated with entry into a program guide or a channel selected by the user. Program Title block 204 displays the simple program information associated with the highlighted channel 209, the highlighted time 207, and the date indicated in the Instruction block 202. The Program Description block 210 displays additional program information for the highlighted program 205 associated with the highlighted channel 209 and the highlighted time 207. Picture block 220 displays a scaled down video of the currently tuned channel, a still picture, a video clip, live video of the last channel viewed, information or video associated with the highlighted program 205, or information or video associated with the program guide. The program guide display has been described in general terms. There are a wide variety of other display formats for program guides and the specific format or content of a program guide does not limit the present invention.

Figure 3:
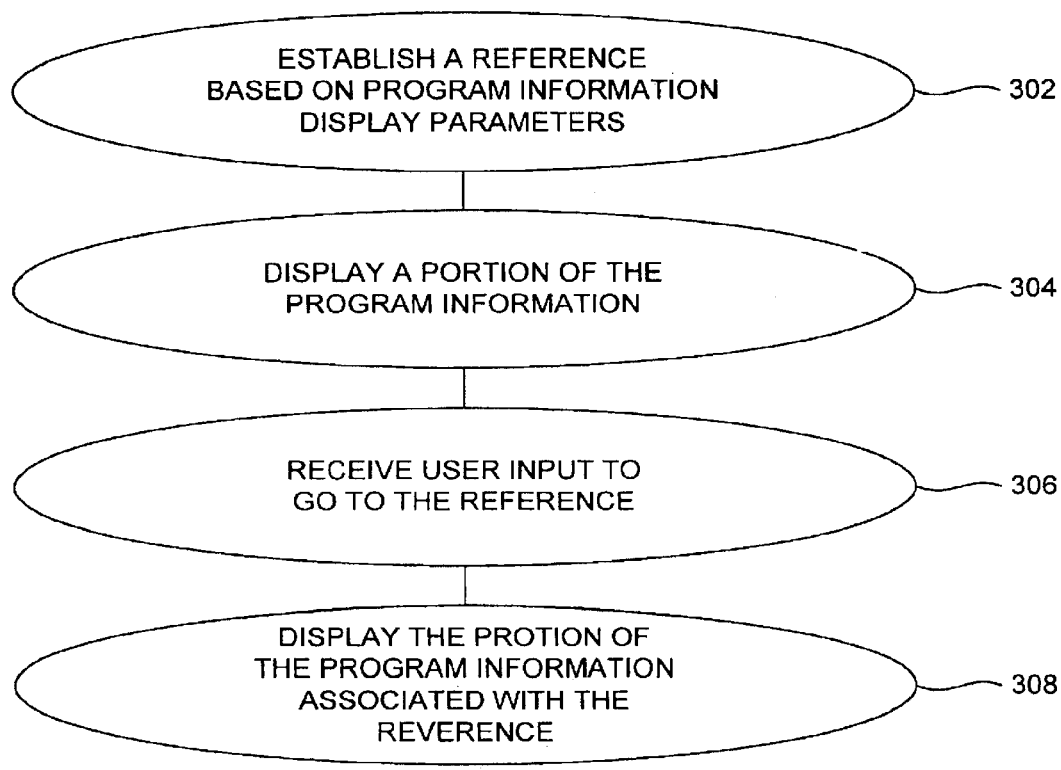
FIG. 3 illustrates a method for navigating within program information to an established reference point.

FIG. 3 illustrates an exemplary method 300 for navigating within program information to an established reference point. A reference point is established with respect to the display parameters of the program information at step 302. The reference point is a set of parameters associated with the displayed program information such as the view the user has selected, the channel to which the HCT is tuned, the current time, the theme of the current program, and the alphabetical title of the current program. The reference point can be stored in the HCT 155 memory as part of an EPG software application machine-state associated with the reference point. Storing a machine-state encompasses storage of the display parameters, program information, and other data required to re-create the machine-state. The program information can either be stored as pointers to records within the EPG database from which the information can be accessed and retrieved or as an instance of the EPG record that is copied and saved in memory as data. In an embodiment, the reference point is a machine-state for which information is stored in memory and that, responsive to user input, the EPG software application and a CPU execution can retrieve, process, and recreate the machine-state of the reference point. The reference can be a single parameter, such as time, or a combination of parameters such as time and channel. Typically the system operator will define and establish the reference point. At step 304, a portion of the program information is displayed in the form of a program guide. A subscriber can scroll through the program guide to display different portions of the program information of interest to the subscriber. When the subscriber desires to go to the established reference point the subscriber provides user input to the system at step 306. The user input is typically the pressing of a single button on a remote control. After receiving the user input, the display is changed to show the portion of the program information associated with the reference at step 308. This can be accomplished, for example, by a CPU retrieving the display parameters and program information associated with the reference point that were previously stored in memory and then processing the data to cause the display of the program guide presentation corresponding to the reference point or reference point's machine-state. Thus method 300 allows a subscriber with a single button press display the program information associated with an established reference point.

In one embodiment, the present invention allows a user to quickly navigate within a program guide to the program information associated with an established reference point "Home", as indicated in FIG. 2 by the Home icon 250 in the Instruction block 202. In this embodiment, the "Home" reference is the current time, current date, and the channel number of the last channel viewed prior to the display of the program guide. So, when the user presses the C button on a remote control, the program guide display 200 changes so that the highlighted time 207 is the current time on the current date and the highlighted channel 209 is the channel number of the last channel viewed prior to the display of the program guide. The user can always return to this reference point with a single push of the "C" button, regardless of how many days or channels away they are after navigating within the program guide.

The present invention can also be used with other methods of displaying program information, such as browse banners, barkers, category window, or Pay-per-view guides, to allow a user to quickly navigate to program information associated with an established reference point. A browse banner allows a user to view the current and future programming for a single channel or category. Even with a simple browse banner the user could end up at program information days into the future. The use of a single button to quickly return to the program information for the current time provides a user friendly navigation option for the subscriber. Program information displayed by Theme could use a reference point associated with the theme of the current program at the current time and date or it could be associated with the first alphabetical listing of the theme of the current program. Program information displayed by Title could use a reference point associated with the first letter of the current program at the current time and date or it could be the first title listed in the program information by alphabetical order and a selection within that first title information.

Establishing and defining the point of reference can be accomplished by a variety of methods. The system operator for subscriber television system 100 located at headend 110 can set the program guide parameters such that the established reference point is the last viewed channel, prior to the display of the program guide, and the current time and date. The system operator using system control parameters could establish any of a variety of reference points for the program guide and other program information related display methods. In addition, the established reference point could be defined by or related to a subscriber selection. The subscriber could be allowed to select from a list of alternative reference points provided by the system control parameters or the established reference point could be associated with a Favorite setting within a program guide. The Favorite associated reference point is not directly selected by the subscriber but would be related to the subscriber's selection of a Favorite channel. For example, a subscriber selects ESPN as their favorite channel. The established reference point could then be defined as the ESPN related channel and the current time and date. Pushing the "C" button on a remote control, while viewing the program guide, would always return this subscriber to the program information for ESPN at the current time and date.

In another embodiment, pressing the "C" or HOME key generates the display of a menu of reference points from which a user can select. The user could scroll up and down using directional arrows on a remote control unit and use a select button to chose a highlighted reference point. The machine-state of each reference point would be stored a priori in memory for quickly enacting a reference point machine-state upon selection.

Conclusion

From the foregoing, it will be appreciated that the present invention provides an efficient method and system that allows a user to quickly navigate within a program guide to an established reference point, such as the program information associated with the last viewed channel and the current time.

The present invention has been described in relation to particular embodiments, which are intended in all respects to be illustrative rather than restrictive. For example, the exemplary reference point, Home, could instead be labeled with any of a variety of names such as Jump, Start, Return, or Current. The reference point could be any of a variety of points with in the program information including other combinations of time, channel, category, and position within the program guide. For example, the reference point could be the last channel viewed prior to the display of the program guide at the last user selected time (not the current time) or a favorite channel at the current time or a single dimension parameter such as a selected category of program information, such as Sports or Movies.

The references to the last viewed channel or to the program viewed immediately prior to causing the program information to be displayed provides a reference from the subscribers perspective, typically while displaying the program information the HCT remains tuned to that channel until another channel is selected.

Those skilled in the art will appreciate that although the present invention has been described in the context of icon displayed with the program information, a user could be informed of the functionality of the present invention via other methods such as a separate display, help window, or an instruction manual, and that other embodiments would not require an icon. In addition, there could be multiple icons representing different reference points.

In conclusion, while exemplary embodiments of the invention have been illustrated and described, it will be clear that the invention is not so limited. Alternative embodiments will be apparent to those skilled in the art to which the present invention pertains without departing from its spirit or scope. Accordingly the appended claims rather than the foregoing description define the scope of the present invention.

What is claimed is:

1. A method for providing television program information by a television set-top terminal (STT), the method comprising:

receiving by the STT a first user input corresponding to a value of at least one parameter, said at least one parameter corresponding to a relative location within a television program guide screen;

storing by the STT said value of the at least one parameter in memory;

associating said value of the at least one parameter with a user input key;

receiving by the STT a second user input;

providing by the STT a first television program guide screen responsive to receiving the second user input;

receiving by the STT a third user input corresponding to a single activation of the user input key; and responsive to receiving the third user input, providing by the STT a second television program guide screen that includes television program information corresponding to the relative location.

2. The method of claim 1, wherein an icon depicting the user input key is displayed within the first television program guide screen.

3. The method of claim 1, wherein the television program guide includes rows of television program titles, each of the rows including a plurality of television program titles and corresponding to a television channel.

4. The method of claim 1, wherein the at least one parameter is one of a current time, a current day, and a television channel being presented immediately prior to the provision of the television program guide.

5. The method of claim 1, wherein the television program information comprises a highlighted television program title.

6. The method of claim 1, wherein the at least one parameter includes a current time and a television channel that was being presented immediately prior to the provision of the television program guide.

7. A method for providing television program information by a television set-top terminal (STT), the method comprising:

providing by the STT a first television program guide screen that includes a grid of television program titles sorted by corresponding starting times in a first direction and by corresponding channel numbers in a second direction that is different from the first direction;

receiving by the STT a user input provided by a single user input key and received during the providing of the first television program guide screen; and responsive to the receiving of the user input, providing by the STT a second television program guide screen that includes a grid of television program titles sorted by corresponding starting times in a first direction and by corresponding channel numbers in a second direction that is different from the first direction, the grid in the second television program guide screen including a current television program title corresponding to a current time and to a television channel that was being presented immediately prior to the providing of the first television program guide screen.

8. The method of claim 7, wherein the current television program title comprises a highlighted television program title.

9. The method of claim 7, wherein the television program guide includes rows of television program titles, each of the rows including a plurality of television program titles and corresponding to a television channel.

10. The method of claim 7, wherein:

the first television program guide screen includes a first plurality of television program titles corresponding to future times and to television channels other than a television channel that was being presented immediately prior to the providing of the television program guide screen; and the second television program guide screen includes a second plurality of television program titles including a plurality of program titles corresponding to a current time and a plurality of program titles corresponding to the television channel that was being presented immediately prior to the provision of the television program guide.

11. A television set-top terminal (STT) for providing television program information, the STT comprising:

a processor; and memory containing software that is configured to be executed by the processor and to cause the STT to:

provide a first television program guide screen responsive to receiving a first user input, the first television program guide screen including a grid of television program titles sorted by corresponding starting times in a first direction and by corresponding channel numbers in a second direction that is different from the first direction;

provide a second television program guide screen responsive to receiving a second user input, the second television program guide screen including a grid of television program titles sorted by corresponding starting times in a first direction and by corresponding channel numbers in a second direction that is different from the first direction, the grid in the second television program guide screen including a current television program title corresponding to a current time and to a television channel that was being presented immediately prior to the provision of the first television program guide screen, the second user input being provided by a single activation of a user input key and being received while the first television program guide screen is being provided.

12. The STT of claim 11, wherein the current television program title comprises a highlighted television program title.

13. The STT of claim 11, wherein the first television program guide screen and the second television program guide screen each include rows of television program titles, each of the rows including a plurality of television program titles and corresponding to a respective television channel.

14. The STT of claim 11, wherein:

the first television program guide screen includes a first plurality of television program titles corresponding to future times and to television channels other than a television channel that was being presented immediately prior to the providing of the television program guide screen; and the second television program guide screen includes a second plurality of television program titles including a plurality of program titles corresponding to a current time and a plurality of program titles corresponding to the television channel that was being presented immediately prior to the provision of the television program guide.

15. A television set-top terminal (STT) for providing television program information, the STT comprising:

a processor; and memory containing software that is configured to be executed by the processor and to cause the STT to:

provide a first television program guide screen;

provide a second television program guide screen responsive to receiving a second user input while the first television program guide screen is being provided; and provide, within the second television program guide screen, a television program title corresponding to at least one parameter identified by a first user input responsive to receiving a third user input, the at least one parameter corresponding to a relative location within a television program guide screen.

16. The STT of claim 15, wherein the third user input is provided by a single activation of a user input key.

17. The STT of claim 15, wherein the television program guide includes rows of television program titles, each of the rows including a plurality of television program titles and corresponding to a television channel.

18. The STT of claim 15, wherein the at least one parameter is one of a current time, a current day, and a television channel being presented immediately prior to the provision of the television program guide.

19. The STT of claim 15, wherein the television program title is a highlighted television program title.

20. The STT of claim 15, wherein the at least one parameter includes a current time and a television channel that was being presented immediately prior to the provision of the television program guide.

21. A method for providing television program information by a television set-top terminal (STT), the method comprising:
- defining a relative location within a grid that includes two-dimensionally arranged television program titles corresponding to a plurality of respective channels listed in a first dimension and to a plurality of respective time designations listed in a second dimension;
- after defining the relative location within the grid, outputting television program titles corresponding to a first portion of the grid, said first portion of the grid corresponding to a first plurality of time designations and to a first plurality of channels, wherein the relative location within the grid is located outside the first portion of the grid;
- after outputting the television program titles corresponding to the first portion of the grid, receiving a single user input; and
- responsive to receiving the single user input, outputting television program titles corresponding to a second portion of the grid that includes the relative location, said second portion of the grid corresponding to a second plurality of time designations and to a second plurality of channels.

22. The method of claim 21, wherein the relative location is defined responsive to user input.

23. The method of claim 21, wherein the relative location corresponds to a current time.

24. The method of claim 21, wherein the relative location corresponds to a most recent channel being output prior to outputting the television program titles corresponding to the first portion of the grid.

25. A method for providing television program information by a television set-top terminal (STT), the method comprising:
- defining a relative time and a relative channel within a two-dimensional grid having time as a first dimension and television channels as a second dimension;
- after defining the relative time and relative channel, outputting within the grid a first plurality of television program titles corresponding to a first plurality of respective time designations and to a first plurality of respective channels;
- after outputting the first plurality of television program titles, receiving a single user input; and
- responsive to receiving the single user input, outputting within the grid a second plurality of television program titles corresponding to a second plurality of respective time designations and to a second plurality of respective channels, said second plurality of television program titles including a television program title corresponding to the relative time and to the relative channel.

26. The method of claim 25, wherein the relative time and the relative channel are defined responsive to user input.

27. The method of claim 25, wherein the relative time corresponds to a current time.

28. The method of claim 25, wherein the relative channel corresponds to a most recent channel that was output prior to outputting the first plurality of program titles.

29. A method for providing television program information by a television set-top terminal (STT), the method comprising:
- establishing a reference point based on at least two parameters associated with the display of television program information;
- causing a first portion of television program information to be displayed within a two-dimensional grid having time as a first dimension and television channels as a second dimension, the two dimensional grid having a plurality of rows and a plurality of columns;
- receiving a user input; and
- causing a second portion of television program information to be displayed within the two-dimensional grid responsive to the user input, the second portion of television program information including information corresponding to the reference point.

30. The method of claim 29, wherein the at least two parameters include a television channel that was being displayed immediately prior to causing the first portion of television program information to be displayed.

31. The method of claim 29, wherein the at least two parameters include a predetermined television program title.

32. The method of claim 29, wherein the at least two parameters include a predetermined television program category.

33. The method of claim 29, wherein the at least two parameters include a current time.

34. The method of claim 29, wherein the reference point is established by a television viewer.

35. The method of claim 29, wherein the at least two parameters include a current time and a currently tuned television channel.

36. A method for providing television program information by a television set-top terminal (STT), the method comprising:
- outputting by the STT a list identifying a plurality of reference points within a television program guide;
- receiving by the STT user input corresponding to one of the plurality of reference points;
- associating by the STT said one of the plurality of reference points with a user input key;
- outputting by the STT a first television program guide screen;
- receiving by the STT user input corresponding to a single activation of said user input key; and
- outputting by the STT a second television program guide screen that includes television program guide information corresponding to the reference point responsive to receiving said user input corresponding to a single activation of said user input key.

37. The method of claim 36, wherein said one of the plurality of reference points corresponds to a single television channel.

38. The method of claim 36, wherein said one of the plurality of reference points corresponds to a current date and a current time.

39. A method for providing television program information by a television set-top terminal (STT), the method comprising:
- outputting by the STT a first television program guide screen;
- receiving by the STT user input corresponding to a single activation of said user input key;
- outputting by the STT a list identifying a plurality of reference points within a television program guide responsive to receiving said user input corresponding to a single activation of said user input key;

receiving by the STT user input corresponding to one of the plurality of reference points; and outputting by the STT a second television program guide screen that includes television program guide information corresponding to the reference point responsive to receiving said user input corresponding to one of the plurality of reference points.

40. The method of claim 39, wherein said one of the plurality of reference points corresponds to a single television channel.

41. The method of claim 39, wherein said one of the plurality of reference points corresponds to a current date and a current time.

* * * * *